United States Patent [19]
Lawson et al.

[11] 3,760,638
[45] Sept. 25, 1973

[54] EXTRUDER PRESSURE TRANSMITTER

[75] Inventors: Gerald P. Lawson, Blaine; John T. M. Carlson, Edina, both of Minn.

[73] Assignee: Rosemont Inc., Eden Prairie, Minn.

[22] Filed: Nov. 1, 1971

[21] Appl. No.: 194,393

[52] U.S. Cl. .................................. 73/395, 73/406
[51] Int. Cl. ................................................ G01l 7/08
[58] Field of Search ................. 73/388 B, 388 RN, 73/406, 407 R, 392, 395

[56] References Cited
UNITED STATES PATENTS
| | | | |
|---|---|---|---|
| 3,581,572 | 6/1971 | Frick | 73/406 |
| 3,115,780 | 12/1963 | Jurisch | 137/85 |
| 3,207,179 | 9/1965 | Klagues | 73/392 |

*Primary Examiner*—Donald O. Woodiel
*Attorney*—Ralph L. Dugger et al.

[57] ABSTRACT

A force rebalance type pressure transmitter for use with high pressure extruders wherein a pressure sensitive first diaphragm controls flow of a fluid from a source of fluid under pressure to a chamber. The fluid pressure acts on a second diaphragm to rebalance the force on the first diaphragm through a mechanical force rebalance rod. A series combination of two orifices at least one of which is variable is used in the input fluid conduit, and another combination of orifices is placed in the line leading to the readout equipment to provide pneumatic span and zero adjustment of the device.

14 Claims, 3 Drawing Figures

EXTRUDER PRESSURE TRANSMITTER

BACKGROUND OF THE INVENTION

1. Field of the Invention.

The present invention relates to pneumatic adjusting devices for fluid pressure actuated pressure transmitters.

2. Prior Art.

Extruder pressure sensors which operated on a pneumatic, force rebalance principle are shown in U.S. Pat. No. 3,482,449 issued on Dec. 9, 1969 to Frank D. Werner, and also in U.S. Pat. No. 3,581,572 issued on June 1, 1971 to Roger L. Frick. These transmitters are utilized in high pressure extruders, are not easily damaged, and are accurate in the normal range of operation.

The zero adjustments have been done mechanically and this becomes complicated. Also, span adjustment has been difficult.

SUMMARY OF THE INVENTION

The present invention relates to adjustment of the active pressure elements of fluid actuated mechanisms such as pressure sensing transmitters for use with extruders or the like. Means for penumatically adjusting the span and zero point of pressure transmitters are the forms shown. The adjustments are easily made with pneumatic adjusting devices which include at least one adjustable orifice in series combination with a second orifice that is preferably of fixed size (but may also be adjustable) so that the relative pressure drop through the orifices can be adjusted as desired. The adjusted pressure is applied to a pressure sensitive element open to the pressure between the series connected orifices.

As shown the orifices are easily placed into the extruder pressure transmitter housing, and make accurate adjustment of both the zero and the span very easy to accomplish without other complex external arrangements.

DESCRIPTION OF THE PREFERRED EMBODIMENT

Figure 1:
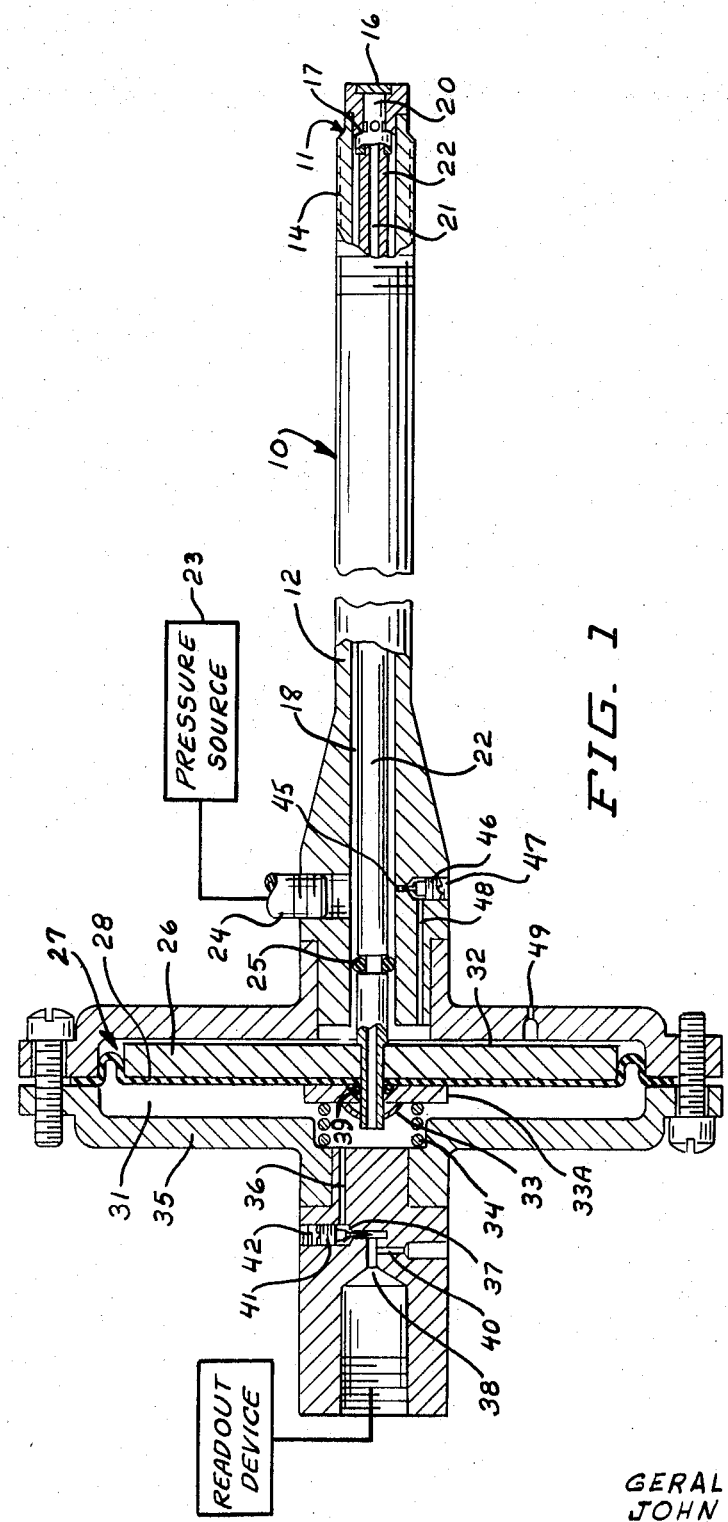
FIG. 1 is a side elevational view of a typical pressure transmitter made according to the present invention with parts in section and parts broken away.

The pneumatic extruder pressure transmitter is shown generally at 10, and has a sensing end 11 that is made to fit into the barrel of an extruder and measure the pressures in the extruder. The transmitter can be mounted in the end adapter section of the extruder with the unit substantially flush with the inner surface of the extruder barrel. The sensor or transmitter comprises a housing 12 that includes an elongated stem 13 that has a threaded portion 14 that screws into the extruder barrel. The end portion 11 of the stem extends into the high pressure area and has a first sensing diaphragm shown at 16 of relatively small diameter that is substantially flush with the interior surface of the extruder barrel. The end portion 11 comprises a pneumatic valve assembly that has an internal valve seat 17, that controls flow from an interior chamber 18 inside the stem 13, to a valve chamber 20. When flow moves past the seat due to mechanical action of pressure on diaphragm 16, it will enter into an interior tubular opening 21 inside a force rebalance rod assembly 22. The rod assembly has a valve head that mates with seat 17. The construction of the valve end 11 is such as that shown in U.S. Pat. No. 3,581,572.

A pressure source 23 is connected through a suitable connection 24 and is open to the interior chamber 18 on a side of the valve seat 17 opposite from the valve chamber 20. The rebalance rod 22 is in contact with diaphragm 16 to mechanically transmit movement to and from the diaphragm 16. The force rebalance rod 22 is sealed with respect to the interior chamber 18 with an O ring 25 on an opposite side of the inlet fitting 24 from the valve seat 17. This seals off the chamber 18 and prevents fluid from going past the O ring 25.

The rod assembly 22, which has the interior chamber 21, is attached to a movable wall section 26 positioned in a chamber 27 formed in the transmitter housing. The wall 26 is attached to a very flexible diaphragm 28 that is annularly sealed around the junction members of the body forming chamber 27. The diaphragm 28 divides the chamber 27 into two separate chambers, namely chamber 31 which is a force rebalance chamber, and a second bleed chamber 32 on an opposite side of the diaphragm 28 from chamber 31. The wall 26 is positioned against a shoulder formed on the force rebalance rod 22, and is held in place with a small washer 33A and a retainer lock ring 33. An O ring seal 39 is provided between washer 33A, the force rebalance rod 22 and the diaphragm 28 to prevent communication of pressure between chambers 31 and 32. The interior tubular opening of rod 22 opens to the chamber 31, as shown. A small spring 34 is positioned against the washer 32, and against the outer portion 35 of the housing forming chamber 31 to reduce transmitter position sensitivity.

A passageway 36 opens to the chamber 31 and the passageway 36 opens through an adjustable orifice 37 to a passageway 38 leading to the readout equipment, such as a pressure gate, or other remote readout which will read or indicate pressure in the passage 38. In addition, the passage 38 has an orifice 40 which as shown is fixed in size, and which discharges to atmosphere. The adjustable orifice 37 is controlled in size with a needle valve member 41. The needle valve 41 is threaded into an opening 42 that opens to the passageway 36 and the orifice 37.

An orifice 45 opens into the interior stem chamber 18, and this orifice 45 has a needle valve 46 positioned therein that is threaded into an opening 47 for the needle valve. The orifice 45 opens through a passageway 48 to the chamber 32. The chamber 32 is open to atmosphere through a fixed orifice 49, as shown.

In operation, when the sensor diaphragm 16 is moved by pressure against it, the valve head will be moved away from seat 17 and the fluid under pressure from the source 23 will flow past this seat 17, into the valve chamber 20 and up into the passageway 21. This will cause fluid under pressure to flow into chamber 31, and the pressure in chamber 31 causes a force on the large movable wall-diaphragm assembly 26,28 to act through the rod 22 to mechanically rebalance the force on the diaphragm 16. This will throttle the valve opening past valve seat 17 so that the flow of fluid will be throttled and a force balance is obtained when the pressure in chamber 31 reaches the level necessary to rebalance the force on diaphragm 16. This operation is explained in the aforementioned U.S. Patent. The fluid pressure in chamber 31 is passed into passageway 36, and there is a flow through the adjustable orifice 37 and fixed orifice 40 to atmosphere. The pressure sensed in the readout passageway 38 is then a fraction of the pressure in chamber 31, depending on the relative sizes of orifices 37 and 40. The pressure in passageway 38 is sensed by readout equipment, and gives an indication of the pressure at the diaphragm 16. The operation of the valve at end 11 and the force rebalance diaphragm is explained in more detail in U.S. Pat. No. 3,581,572. Therefore any details of construction can be obtained from the patent and are omitted in the present device.

Figure 2:
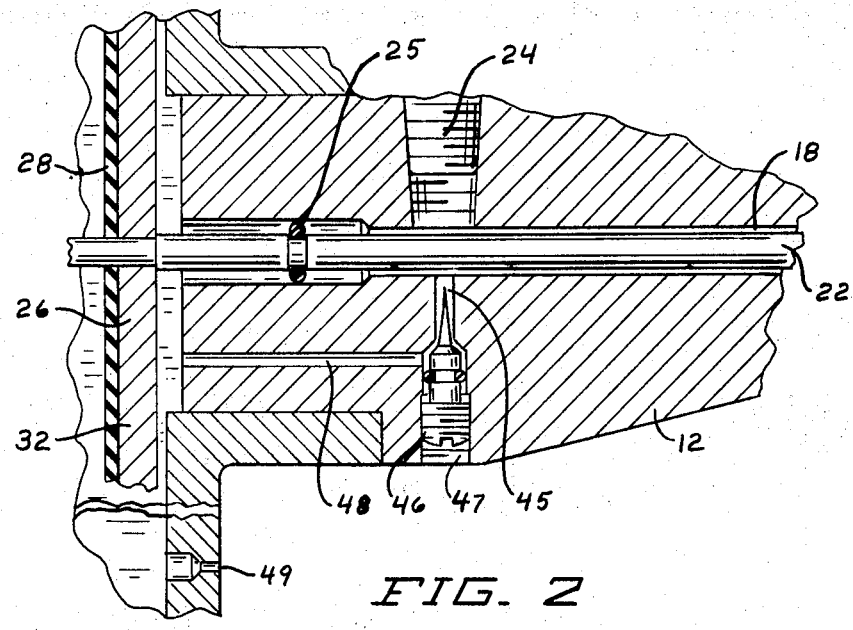
FIG. 2 is a fragmentary enlarged sectional view of a zero adjustment orifice system made according to the present invention.
Figure 3:
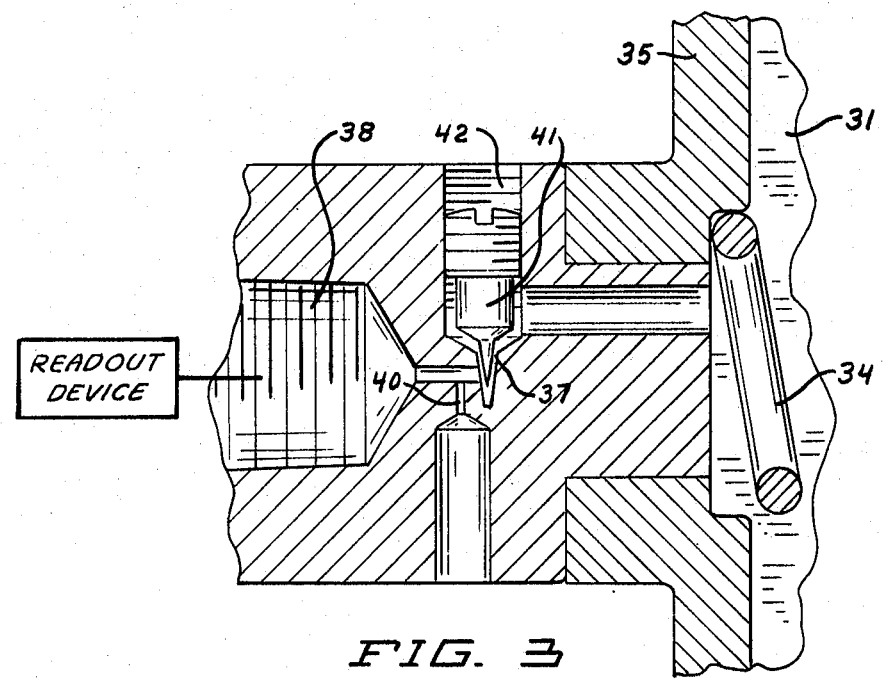
FIG. 3 is a fragmentary enlarged sectional view of the span adjustment orifice system of the present invention.

The zero position of the unit, wherein the readout equipment will be at a zero setting, can be adjusted by regulating the needle valve 46, (see FIG. 2) by permitting some bleeding of pressure from chamber 18 into chamber 32, to act on diaphragm 28. The flow is therefore from source 23 out through the passageway 48 and the fixed orifice 49. By regulating or permitting some flow of fluid under pressure into the chamber 32, a pressure above atmospheric can be built up in the chamber 32 as restricted by the orifice 49 to cause the unit to be balanced at a selected zero position. Therefore when there is some flow past the valve seat 17 and therefore pressure present in the chamber 31, the orifice 45 can be adjusted to give a zero readout by permitting flow through the orifice 45 by regulating the needle valve 46 in its opening 47, permitting some flow into the chamber 32, so that a set pressure is exerted in this chamber. It should also be noted, that the use of the two series connected orifices, at least one of which is adjustable is desired in obtaining the proper regulation of zero position. However, the orifice 49 could be the adjustable orifice, with the orifice 45 being fixed, or both orifices actually could be adjustable if desired. The orifices both have to restrict flow from the pressure source that they lead from. At least one of the orifices acting in a fluid series connection of orifices to the atmosphere has to be adjustable in order to obtain the adjustments desired. The active pressure element being adjusted, in this case the diaphragm or wall 28 is open to the pressure between the series connected orifices.

In order to change the span of the readout equipment for the unit, the series connected flow restricting orifices 37 and 40 are utilized in fluid circuit from the chamber 31. The needle valve 41 can regulate the flow of fluid through the orifice 37 and passageway 36, and thus the flow to atmosphere through orifice 40. The chamber 31 in this case forms the pressure source for operation, and the orifices 37 and 40 restrict flow from the chamber. By throttling the flow of fluid through the passageway 36 with needle valve 41, the pressure in chamber 38 will be less than the pressure in chamber 31, and the percentage of change gives a different span to the readout device through this adjustment.

Stated another way, the pressure at the passageway 38 will be proportional to the pressure in the chamber 31, but the actual pressures may be different by adjusting the needle valve 41 as desired. Again, here the two orifices in series, at least one of which is adjustable is necessary to obtain the proper span adjustment pneumatically. The pressure sensitive element (readout equipment) is sensing pressure between the series connected orifices, just as element 28 is sensing pressure between orifices 45 and 49. The orifice 40 could also be adjustable, and the orifice 37 fixed, or both the orifices 37 and 40 can be adjustable if desired. When viewed in direction of flow, one orifice is upstream and one downstream from the sensing element.

Alternately the orifices (downstream and upstream orifices) could comprise a single elongated restrictor section and the active pressure element would be pneumatically connected at a location between ends of the restrictor sections. This location could be adjustable by providing a number of pressure taps, each at a different location along the restrictor section, any of which could be connected to the active pressure element. In this example, the length of both the downstream and upstream orifices is "adjusted" relatively.

A single adjustable outlet orifice is disclosed in U.S. Pat. No. 3,482,449 leading from the chamber corresponding to the chamber 31, but this does not give a span adjustment because the pressure in the chamber 62 of this will always be the pressure sensed by the readout gage 63 shown. The span adjustment cannot be achieved. There are no series connected orifices, at least one of which is adjustable, with the pressure sensitive element being adjusted sensing the pressure present in the fluid conduit between the two orifices, shown in U.S. Pat. No. 3,482,449.

What is claimed is:

1. In a pressure sensing device operated by fluid pressure from a source and including at least one active fluid pressure responsive means which responds to fluid pressure in a chamber as a function of the parameter to be sensed, the improvement comprising adjustment means for the active fluid pressure responsive means comprising flow restrictor orifice means having upstream and downstream restrictor orifice sections in a series fluid circuit defined in said device leading from the fluid pressure source to an area of different pressure level when the active responsive means is operating, means associated with at least one of said restrictor orifice sections to permit adjusting the size of said one restrictor orifice section, and means fluidly connecting said active fluid pressure responsive means with the series fluid circuit only in a location between said restrictor orifice sections.

2. The device of claim 1, wherein said active fluid pressure responsive means comprises a pressure responsive readout means sensing pressure in a chamber and said series fluid circuit leads from said chamber.

3. The device of claim 1 wherein said fluid pressure responsive means comprises a movable wall means actuated in response to differential fluid pressures thereon, and said series fluid circuit opens to said movable wall.

4. The device of claim 1 further including a sensing diaphragm for sensing pressures, a source of fluid under pressure, a control valve, a movable wall in a chamber movable in response to differential pressures thereon, a rebalance link between the control valve and movable wall, and passageway means whereby fluid under pressure controlled by said valve in response to movements of said first diaphragm communicates with a first side of said movable wall to cause a rebalance force on said valve through said link, said active pressure responsive means comprising a second opposite surface of said movable wall, said series fluid circuit leading from said fluid pressure source.

5. The device of claim 4 wherein said fluid pressure source is higher than atmospheric pressure, and the series circuit leads to atmosphere.

6. The device of claim 4 and a readout means, a readout fluid passageway leading from the chamber formed on the first side of said movable wall to an area of different pressure from said chamber, and a pair of readout flow restriction orifices in said readout passageway, at least one of said readout flow restriction orifices being adjustable, and said readout means comprising a second active fluid pressure responsive means and being open to said readout passageway between said readout flow restriction orifices.

7. The device of claim 5 wherein the orifice leading from the fluid pressure source to the second orifice includes adjustable means.

8. The device of claim 6 wherein the readout orifice closest to the chamber is adjustable and the second orifice in the readout passageway is fixed in size.

9. In a pressure sensor including a housing, means at a first end of said housing comprising a first diaphragm in position to be deflected due to pressure to be sensed, movable wall means in said housing at a point remote from said first diaphragm and forming first and second chambers in said housing, said movable wall means comprising a first fluid pressure responsive element, a source of fluid under pressure, a first passageway within said housing, said first passageway leading from said source of fluid under pressure to said first chamber, valve means in said first passageway, first means connected between said valve means and said first diaphragm whereby movement of said first diaphragm under sensed pressure changes the position of said valve means to change fluid flow through said first passageway, and second link means between said movable wall means and said valve means whereby a change in differential pressure in said chambers will rebalance said valve means and oppose the movement of said first diaphragm, pressure responsive readout means comprising a second fluid pressure responsive element, the improvement comprising means to adjust the response of one of said fluid pressure responsive elements including a second passageway leading from a fluid pressure area acting on said one fluid pressure responsive element to an area of different pressure from said fluid pressure area, flow restrictor orifice means having an upstream restriction and a downstream restriction in fluid series defined in said second passageway, said one fluid pressure element opening to said second passageway between said upstream and downstream restrictions, and means to adjust the effective amount of fluid flow restriction by at least one of said upstream and downstream restrictions.

10. The sensor of claim 9 wherein said responsive element comprises a readout means, and said fluid pressure area comprises said first chamber open to said first passageway.

11. The sensor of claim 9 wherein said responsive element comprises said movable wall, and said fluid pressure area comprises said first passageway on a side of said valve opposite from said first chamber, said second chamber formed by said movable wall on a side thereof opposite from the first chamber being open to said second passageway between said orifice means.

12. The sensor of claim 9 wherein there are two fluid pressure responsive elements, and each of said responsive elements is open to separate second passageways, and each of said second passageways including at least one adjustable flow restriction orifice means in fluid series with another flow restriction orifice means.

13. In a pressure sensor including a housing, means at a first end of said housing comprising a first diaphragm in position to be deflected due to pressure to be sensed, movable wall means in said housing at a point remote from said first diaphragm and forming first and second chambers in said housing, a source of fluid under pressure, a first passageway within said housing, said first passageway leading from said source of fluid under pressure to said first chamber, valve means in said first passageway, first means connected between said valve means and said first diaphragm whereby movement of said first diaphragm under sensed pressure changes the position of said valve means to change fluid flow through said first passageway, and second link means between said movable wall means and said valve means whereby a change in differential pressure in said chambers will rebalance said valve means and oppose the movement of said first diaphragm, pressure responsive readout means associated with said first chamber, the improvement comprising means to adjust the pressure in said second chamber acting upon said movable wall means including a second passageway leading from said fluid pressure source to an area of lower pressure from said fluid pressure source, a pair of flow restrictor orifices in fluid series defined in said second passageway, at least one of said flow restrictor orifices being adjustable, and said second chamber opening to said second passageway between said orifices.

14. The sensor of claim 13 and a third passageway leading from said first chamber to an area of different pressure than normal operating pressure in said first chamber, a pair of flow restrictor readout orifices defined in said third passageway and being in fluid series, said readout means being open to said third passageway between said readout orifices, at least one of said readout orifices being adjustable.

* * * * *